UNITED STATES PATENT OFFICE.

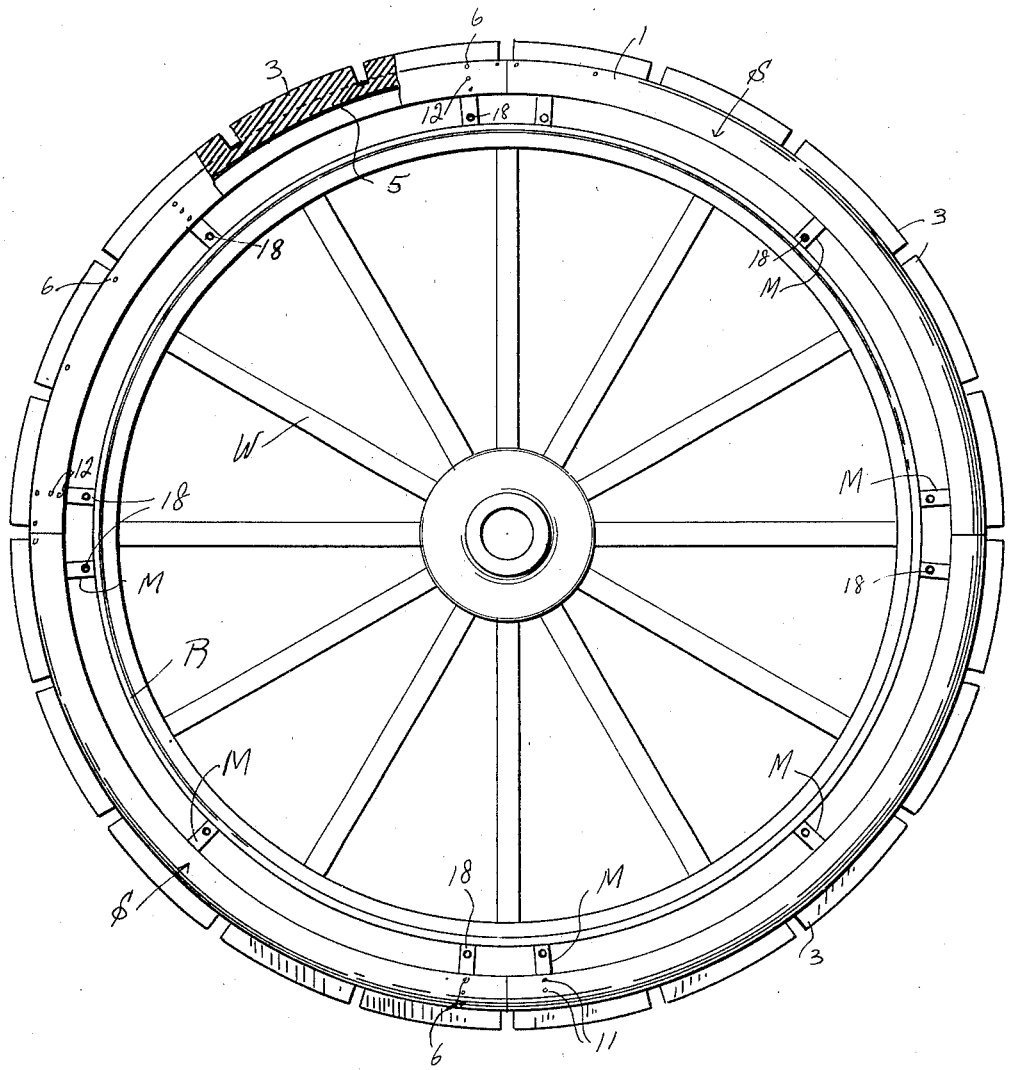

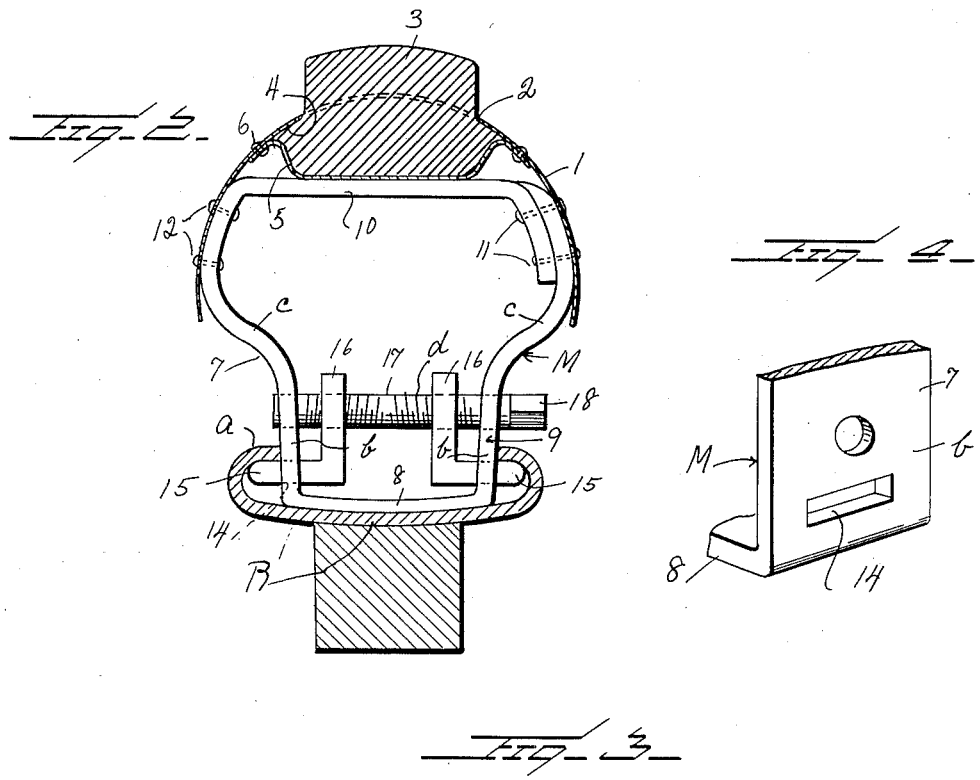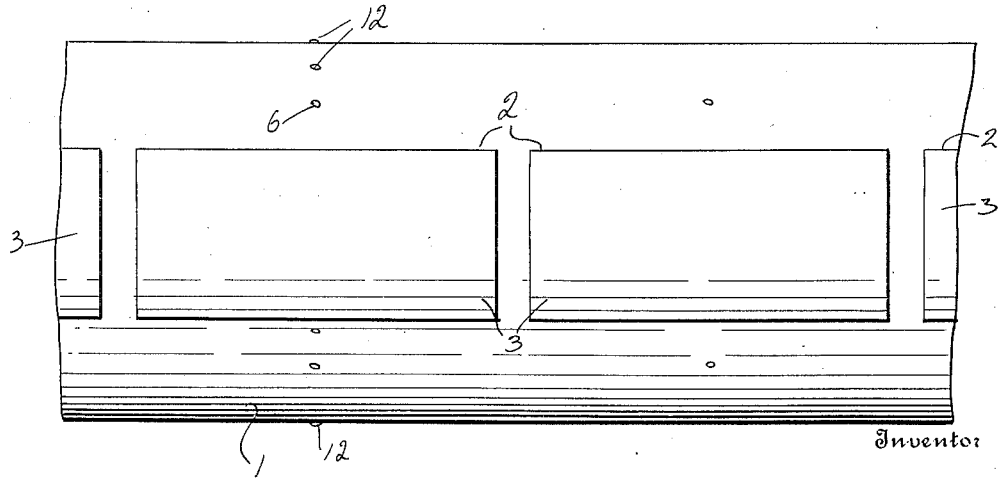

FRANK E. ALLEN, OF PORT HURON, MICHIGAN.

TIRE STRUCTURE.

1,329,819. Specification of Letters Patent. Patented Feb. 3, 1920.

Application filed June 11, 1919. Serial No. 303,283.

*To all whom it may concern:*

Be it known that I, FRANK E. ALLEN, a citizen of the United States, residing at Port Huron, in the county of Saint Clair and State of Michigan, have invented certain new and useful Improvements in Tire Structures, of which the following is a specification, reference being had to the accompanying drawings.

This invention relates to certain improvements in tire structures and has relation more particularly to a structure of this general character of a cushion type, and it is an object of the invention to provide a novel and improved structure of this general character which is especially adapted for use in the case of an emergency, although, if desired, it can be conveniently employed for general use.

It is also an object of the invention to provide a novel and improved structure of this type which comprises a plurality of separable sections so that the structure may be applied with convenience and facility and wherein each of the sections embodies a construction possessing sufficient cushioning action to substantially absorb the shocks and jars incident to the travel of the wheel to which the same is applied.

Another object of the invention is to provide a device of this general character having novel and improved means whereby the same may be effectively engaged with the rim of a wheel body and particularly when said rim is of a clencher type employed in connection with the Ford car or other well known types of machines.

The invention consists in the details of construction and in the combination and arrangement of the several parts of my improved tire structure whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view, partly in side elevation and partly in section illustrating a tire structure arranged in accordance with an embodiment of my invention.

Fig. 2 is an enlarged fragmentary transverse sectional view taken through my improved structure as herein disclosed.

Fig. 3 is an enlarged fragmentary view in top plan of my improved tire structure as herein embodied, and Fig. 4 is a fragmentary view in perspective of one of the holding members herein employed.

My improved tire structure as herein embodied comprises a plurality of arcuate sections S, preferably four in number, and, when applied to the wheel structure W, are substantially in continuity. Each of the sections S comprises a tread member 1 preferably formed of thin pressed steel and curved in cross section.

The central portion of the member is provided with a plurality of circumferentially alined elongated slots 2. Disposed through said slots 2 are the calks 3 of rubber or other compressible material. The calks 3 are carried by a strip or member 4 of similar material and coacting therewith is a retaining plate 5. The plate 5 contacts with or rests against the strip or member 4 and extends substantially the entire length of the section.

Coacting with the opposite end portions of the member 1 and the central portion thereof are the inwardly directed and substantially rigid holding members M which coact with the rim R of the wheel body W for maintaining the section in applied position. The rim R is preferably of a clencher type such as is used in connection with the Ford or other well known makes of cars.

Each of the members M is formed of an elongated plate or flat strip 7 formed to afford an intermediate or base portion 8 adapted to snugly contact with the rim R between the flanges *a* thereof. The end portions of the base 8 are continued by the outwardly directed side members 9 having their inner portions *b* substantially in parallelism. The outer end portions *c* of the side members 9 are outwardly curved and the outer extremity of one of the portions *c* is continued by the transversely disposed extension 10 anchored as at 11 to the outer extremity of the portion *c* of the second side member 9. The anchoring means 11 constitute rivets which also serve to hold a side marginal portion of the member 1 to the member M. The portions *c* of the first named side member is secured to the opposite marginal portion of the member 1 by the rivets 12 or the like.

The inner extremities of the portions *b* of the side members 9 are provided with transversely disposed slots 14 through which extend the lugs 15. The lugs 15 at their inner ends and between the portions *c* of the side members 9 are provided with the outwardly directed ears 16 through which are threaded a shank 17 rotatably supported by the portions *b* of the side members 9. An end portion 18 of the shank 17 is angular in cross section so that the same may be engaged by a key or other implement for imparting the requisite rotation to the shank 17.

The opposite end portions of the shank 17 are reversely threaded, as indicated at *d*, and with which the ears 16 engage so that upon rotation of the shank 17, the lugs 15 will be caused to move in unison longitudinally of the shank 17 but in reverse directions. By this it will be understood that upon rotation of the shank 17, the lugs 15 will be caused to engage within the flanges *a* to lock the member M to the rim R or the lugs 15 may be retracted in order to permit removal of the sections S.

By having my improved tire structure in sections, the same can be readily stored within the tool box or other portion of the car and in the event of an inflatable tire becoming unfit for use, my improved structure in such an emergency can be readily applied.

While my improved structure is primarily intended for use in the event of a condition such as this, it will also be understood that it can also be employed for general use.

From the foregoing description, it is thought to be obvious that a tire structure arranged in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A tire structure including a tread and holding members carried by said tread, each of said holding members embodying side members provided with openings, lugs extending through said openings, and means for moving the lugs in unison but in reverse directions.

2. A tire structure including a tread and holding members carried by said tread, each of said holding members embodying side members provided with openings, lugs extending through said openings, the adjacent extremities of the lugs being provided with ears and a reversely threaded shank rotatably supported by the side members and with which the ears are engaged, whereby the lugs move in unison longitudinally of the shank but in reverse directions upon rotation of the shank.

3. A tire structure comprising a tread and holding members carried by said tread, each of said holding members comprising a base and side members, said side members being provided with openings, lugs extending through said openings, and means for moving the lugs in unison through the openings.

4. A tire structure comprising a tread and holding members carried by said tread, each of said holding members comprising a base and side members, said side members being provided with openings, lugs extending through said openings, and means for moving the lugs in unison through the openings and in reverse directions.

5. A tire structure comprising a tread and holding members carried by said tread, each of said holding members comprising a base and side members, said side members being provided with openings, lugs extending through said openings, and a reversely threaded shank rotatably supported by the side members, said lugs being engaged with the threads of the shank whereby said lugs move in unison longitudinally of the shank but in reverse directions upon rotation of the shank.

In testimony whereof I hereunto affix my signature in the presence of two witnesses.

FRANK E. ALLEN.

Witnesses:
FLORENCE NEWCOMB,
H. W. MAITLAND.